UNITED STATES PATENT OFFICE.

FRANCIS BASCHNAGEL, OF WENHAM, ASSIGNOR TO BEVERLY RUBBER COMPANY, OF BEVERLY, MASSACHUSETTS.

IMPROVEMENT IN RESTORING WASTE VULCANIZED RUBBER.

Specification forming part of Letters Patent No. 23,740, dated April 19, 1859.

*To all whom it may concern:*

Be it known that I, FRANCIS BASCHNAGEL, of the town of Wenham, in the county of Essex, in the State of Massachusetts, have invented a new and useful process of restoring waste vulcanized or hard india-rubber—that is to say, such rubber which, being once cured or prepared by any of the processes granted by the United States to Charles Goodyear, or any other process applied for similar purposes, has by any reason become waste or useless, or, having been manufactured into car-springs, shoes, packing, canes, and other substances and fabrics, has served or been deemed to have served its purpose, or otherwise become unfit for the purposes of use, wearing, trade, or commerce—to such a soft, plastic, or gummy state that it may be used again in the manufacture of india-rubber fabrics and substances; and I do hereby declare that the following is a full and exact specification of said improvement.

I grind the waste vulcanized rubber between fluted or scored rollers, or what are known as "mullers," or otherwise divide the same, until it is reduced to a finely-divided state, and then submit the same to the operation of boiling water in caldrons, kettles, tanks, or other vessels suited to the purpose. By boiling the mass in water for about forty-eight hours it becomes reduced to a plastic or gummy state, fit to be used again in the manufacture of india-rubber fabrics. After having prepared the waste rubber, as above described, by boiling, I grind the same again between rollers or cylinders from two to four hours, and then remove it to the drying-room, where it is kept until free from water, when it may be used again in the manufacture of india-rubber fabrics.

What I claim as my invention, and desire to secure by Letters Patent, is—

The process above described—that is, boiling waste vulcanized rubber in water after it has been reduced to a finely-divided state for the purpose of restoring the same to a plastic, gummy, or elastic state, fit to be used again in the manufacture of india-rubber fabrics and substances, as above set forth.

FRANCIS BASCHNAGEL.

In presence of—
FRANCIS P. SWEET,
WILLIAM W. MEGRONIGLE.